(12) United States Patent
Lee et al.

(10) Patent No.: US 10,602,185 B2
(45) Date of Patent: Mar. 24, 2020

(54) SYSTEMS, METHODS, AND COMPUTER PROGRAM PRODUCTS FOR A VIDEO ENCODING PIPELINE

(75) Inventors: Sang-Hee Lee, Santa Clara, CA (US); Jian James Zhou, Fremont, CA (US); Ning Lu, Saratoga, CA (US); Jason D. Tanner, Folsom, CA (US); Changwon D. Rhee, Rocklin, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 13/995,181

(22) PCT Filed: Sep. 30, 2011

(86) PCT No.: PCT/US2011/054386
§ 371 (c)(1),
(2), (4) Date: Jun. 18, 2013

(87) PCT Pub. No.: WO2013/048471
PCT Pub. Date: Apr. 4, 2013

(65) Prior Publication Data
US 2013/0266072 A1  Oct. 10, 2013

(51) Int. Cl.
*H04N 7/12* (2006.01)
*H04N 19/61* (2014.01)
(Continued)

(52) U.S. Cl.
CPC ............ *H04N 19/61* (2014.11); *H04N 19/43* (2014.11); *H04N 19/436* (2014.11); *H04N 19/53* (2014.11); *H04N 19/577* (2014.11)

(58) Field of Classification Search
USPC .................................................... 375/240.16
See application file for complete search history.

(56) References Cited

U.S. PATENT DOCUMENTS

| 5,844,609 A | 12/1998 | Filor et al. |
| 8,243,802 B2 | 8/2012 | Boon et al. |

(Continued)

FOREIGN PATENT DOCUMENTS

| CN | 101547354 | 9/2009 |
| JP | 10-224799 A | 8/1998 |

(Continued)

OTHER PUBLICATIONS

International Search Report and Written Opinion received for International Application No. PCT/US2011/054386, dated Apr. 18, 2012, 10 pages.

(Continued)

*Primary Examiner* — Jamie J Atala
*Assistant Examiner* — Patrick E Demosky
(74) *Attorney, Agent, or Firm* — Green, Howard, & Mughal LLP.

(57) ABSTRACT

Methods, systems and computer program products that may improve the efficiency of the video encoding process. Mode decision processing and bit stream packing may be performed in parallel for various frames in a sequence. This reduces the amount of idle time for both the mode decision processing logic and the bit stream packing logic, improving the overall efficiency of the video encoder.

8 Claims, 17 Drawing Sheets

(51) Int. Cl.
*H04N 19/53* (2014.01)
*H04N 19/436* (2014.01)
*H04N 19/577* (2014.01)
*H04N 19/43* (2014.01)

(56) References Cited

U.S. PATENT DOCUMENTS

| | | | | |
|---|---|---|---|---|
| 8,351,508 | B1* | 1/2013 | Foulds | H04N 19/70 |
| | | | | 375/240.12 |
| 8,553,964 | B2* | 10/2013 | Chefd'hotel | G01R 33/56366 |
| | | | | 382/131 |
| 8,787,443 | B2* | 7/2014 | Sun | H04N 7/26058 |
| | | | | 375/240 |
| 2005/0276329 | A1* | 12/2005 | Adiletta | H04N 19/159 |
| | | | | 375/240.16 |
| 2006/0256854 | A1* | 11/2006 | Jiang | H04N 19/176 |
| | | | | 375/240.03 |
| 2007/0127573 | A1* | 6/2007 | Soroushian | H04N 19/51 |
| | | | | 375/240.16 |
| 2008/0130748 | A1 | 6/2008 | Robers et al. | |
| 2009/0122869 | A1* | 5/2009 | Huang | H04N 19/61 |
| | | | | 375/240.24 |
| 2009/0245374 | A1* | 10/2009 | Hsu | H04N 19/105 |
| | | | | 375/240.16 |
| 2010/0020786 | A1 | 1/2010 | Futaki et al. | |
| 2010/0020877 | A1 | 1/2010 | Au et al. | |
| 2010/0097491 | A1* | 4/2010 | Farina | H04N 9/045 |
| | | | | 348/223.1 |
| 2010/0022786 | A1 | 9/2010 | Wang et al. | |
| 2010/0220786 | A1* | 9/2010 | Wang | H04N 19/53 |
| | | | | 375/240.15 |
| 2011/0206125 | A1* | 8/2011 | Chien | H04N 19/52 |
| | | | | 375/240.16 |
| 2012/0236940 | A1* | 9/2012 | Katzur | H04N 19/61 |
| | | | | 375/240.16 |

FOREIGN PATENT DOCUMENTS

| | | |
|---|---|---|
| JP | 2000295616 A | 10/2000 |
| JP | 2011182169 | 9/2011 |
| WO | 2013/048471 A1 | 4/2013 |

OTHER PUBLICATIONS

International Preliminary Report on Patentability and Written Opinion received for International Application No. PCT/US2011/054386, dated Apr. 10, 2014, 7 pages.
Office Action for Japanese Patent Application No. 2014-529669 dated Mar. 10, 2014.
Final Office Action for Japanese Patent Application No. 2014-529669 dated Jun. 30, 2015.
Office Action for Taiwan Patent Application No. 1011327467 dated Apr. 30, 2015.
Notice of Allowance for Taiwan Patent Application No. 1011327467 dated Sep. 25, 2015.
Office Action for Chinese Patent Application No. 201180073798.7 dated May 3, 2017. Translation included.
Office Action dated Aug. 31, 2016, for Chinese Patent Application No. 201180073798.7, No translation available.
Extended European Search Report for European Patent Application No. 11873447.4 dated Feb. 15, 2016, 6 pages.
Wiegand, T. et al. "Overview of the H.264/AVC Video Coding Standard", IEEE Transactions on Circuits and Systems for Video Technology, IEEE Service Center, Piscataway, NJ, US, vol. 13, No. 7, Jul. 1, 2003, 17 pages.
Office Action for Chinese Patent Application No. 201180073798.7 dated Oct. 27, 2017.
Notice of Allowance for Chinese Patent Application No. 201180073798.7, dated May 10, 2018.
Office Action for European Patent Application No. 11873447.4, dated Oct. 15, 2018.

* cited by examiner (Prior art)

(Prior art)

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 | | P3 | | B1 | | B2 | | P6 | | B4 | | B5 | |
| PAK | | I0 | | P3 | | B1 | | B2 | | P6 | | B4 | | B5 |

200

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 | | P1 | | P2 | | P3 | | P4 | | P5 | | P6 | |
| PAK | | I0 | | P1 | | P2 | | P3 | | P4 | | P5 | | P6 |

300

400

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 |  | P3 |  | B1 | B2 | P6 |  | B4 | B5 | P9 |  | B7 | B8 |
| PAK |  | I0 |  | P3 |  | B1 | B2 | P6 |  | B4 | B5 | P9 |  | B7 |

| Time | 0  | 1  | 2  | 3  | 4  | 5  | 6  | 7  | 8  | 9  | 10 | 11 | 12 | 13 |
|------|----|----|----|----|----|----|----|----|----|----|----|----|----|----|
| ENC  | I0 |    | P3 | B1 | B2 | P6 | B4 | B5 | P9 | B7 | B8 | ... | ... | ... |
| PAK  |    | I0 |    | P3 | B1 | B2 | P6 | B4 | B5 | P9 | B7 | ... | ... | ... |

FIG. 6

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 | P3 | B1 | B2 | P6 | B4 | B5 | P9 | B7 | B8 | ... | ... | ... | ... |
| PAK | | I0 | P3 | B1 | B2 | P6 | B4 | B5 | P9 | B7 | ... | ... | ... | ... |

FIG. 8

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 | P3_i | P3_f | B1_i | B1_f | B2 | P6 | B4_i | B4_f | B5 | P9 | B7_i | B7_f | B8 |
| PAK |  | I0 |  | P3 |  | B1 | B2 | P6 |  | B4 | B5 | P9 |  | B7 |

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 | P1_i | P1_f | P2_i | P2_f | P3_i | P3_f | P4_i | ... | ... | ... | ... | ... | ... |
| PAK |  | I0 |  | P1 |  | P2 |  | P3 | ... | ... | ... | ... | ... | ... |

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| ENC | I0 | P3_L | P3_H | B1_L | B1_H | B2 | P6 | B4_L | B4_H | B5 | P9 | B7_L | B7_H | B8 |
| PAK |  | I0 |  | P3 |  | B1 | B2 | P6 |  | B4 | B5 | P9 |  | B7 |

FIG. 14

| Time | 0  | 1    | 2    | 3    | 4    | 5    | 6    | 7    | 8   | 9   | 10  | 11  | 12  | 13  |
|------|----|------|------|------|------|------|------|------|-----|-----|-----|-----|-----|-----|
| ENC  | I0 | P1_L | P1_H | P2_L | P2_H | P3_L | P3_H | P4_L | ... | ... | ... | ... | ... | ... |
| PAK  |    | I0   |      | P1   |      | P2   |      | P3   | ... | ... | ... | ... | ... | ... |

SYSTEMS, METHODS, AND COMPUTER PROGRAM PRODUCTS FOR A VIDEO ENCODING PIPELINE

BACKGROUND

Video encoding may include two processes, mode decision (including motion estimation) and bitstream packing (including frame reconstruction). These processes may be implemented in a pipelined fashion. The mode decision process may run on a programmable core, while bitstream packing may be implemented in hardware. Alternatively, these processes may run on an architecture that includes a central processing unit (CPU) that offloads some tasks to a graphics processing unit (GPU). For example, bitstream packing may run on a CPU while the mode decision may be executed on a GPU.

The interaction between the mode decision and bitstream packing operations includes interdependencies that may slow the encoding process. This two-stage pipelining may be picture-based, where an entire frame may be processed by the mode decision logic; the entire frame may then be processed by the bitstream packing logic. The bitstream packing logic may wait for the mode decision logic to finish processing the frame in order to access the motion vectors and additional information, such as macroblock modes, produced by the mode decision logic. The mode decision logic may wait for the completion of the bitstream packing logic as performed on the previous frame, because the mode decision logic may use the reconstructed frame as a reference for motion estimation (ME). These dependencies contribute to the time required for the video encoding process, and may therefore impact the user experience.

BRIEF DESCRIPTION OF THE DRAWINGS/FIGURES

FIG. 4 is a diagram illustrating the processing of a frame sequence, according to an embodiment.

FIG. 6 is a diagram illustrating the processing of a frame sequence, according to an embodiment.

FIG. 8 is a diagram illustrating the processing of a frame sequence, according to an alternative embodiment.

FIG. 12 is a diagram illustrating the processing of a frame sequence, according to an alternative embodiment.

FIG. 14 is a diagram illustrating the processing of a frame sequence, according to an alternative embodiment.

Figure 1:
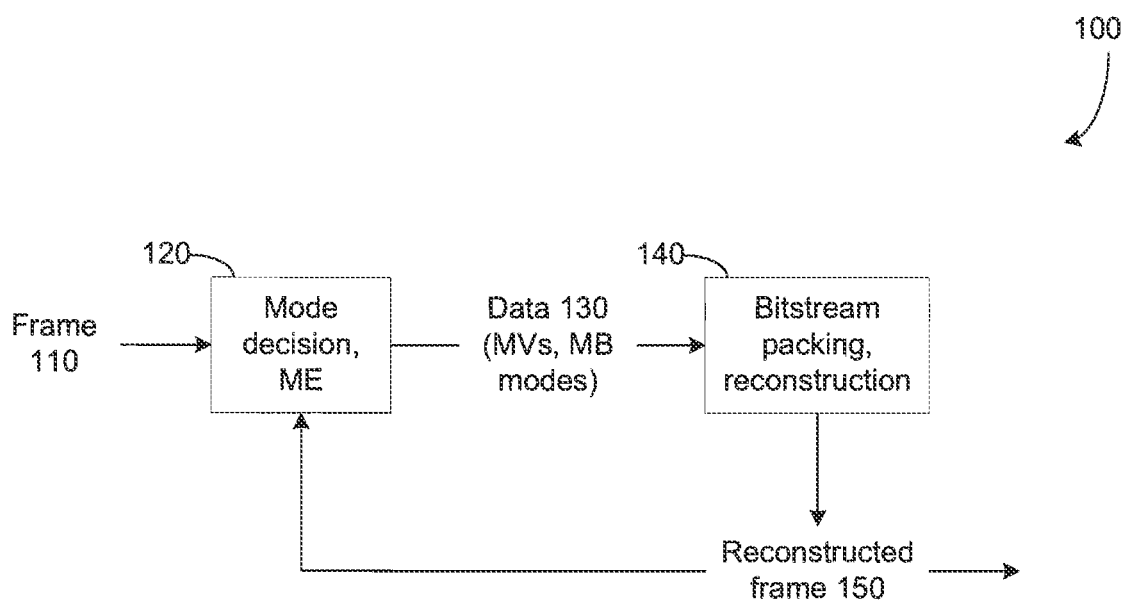
FIG. 1 is a block diagram illustrating pipelined mode decision and bitstream packing processes.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems and computer program products that may improve the efficiency of the video encoding process. Mode decision processing and bit stream packing may be performed in parallel for various frames in a sequence. This reduces the amount of idle time for both the mode decision processing logic and the bit stream packing logic, improving the overall efficiency of the video encoder.

FIG. 1 illustrates the dependencies that occur in video encoding. A frame 110 may be input into a mode decision module 120. This module may include motion estimation functionality and produces data 130. Data 130 may include one or more motion vectors (MVs) as well as macroblock (MB) modes. The data 130 may then be input into a bitstream packing module 140. This latter module may include frame reconstruction functionality. Bitstream packing module 140 may then produce a reconstructed frame 150. The bitstream packing processing therefore relies on the MVs and MB modes 130 produced by mode decision module 120. When processing the next frame, however, the mode decision module 120 may require the reconstructed frame 150 produced for the previous frame. Reconstructed frame 150 may be used by mode decision module 120 as a reference for motion estimation purposes for the next frame.

Figure 2:
FIG. 2 is a diagram illustrating the processing of a frame sequence.

This may result in the processing timeline shown in FIG. 2. This figure illustrates the case of a sequence of frames having the form IBBPBBP . . . , in coding order, where I represents an intra frame, B represents a bi-predictive frame, and P represents a predictive frame. In this figure (and in all similar figures to follow), the numerals appended to the letters indicates the position in the overall sequence. The first frame is I0, the next frame is B1, followed by B2, followed by P3, etc. In FIG. 2, each frame may be processed by the mode decision module (shown as "ENC") and then processed by the bitstream packing module (shown as "PAK"), in sequence. While a frame is processed by the mode decision (ENC) module, the bitstream packing (PAK) module may be idle, and vice versa. This accommodates the dependencies described above. For each frame, the bitstream packing process waits for the completion and output (i.e., MVs and MB modes) of the mode decision process. The mode decision process for the next frame waits for the completion of bitstream packing for the previous frame, so that the reconstructed frame of the previous frame may be used for motion estimation.

Initially frame I0 (or an anchor frame P0) may be processed by the mode decision module. This frame may then be processed in the next time interval by the bitstream packing module, using the MVs and MB modes resulting from the mode decision process. After completion of the bitstream packing process for I0, the mode decision process may take place for the next frame, P3, in the next time interval. The mode decision process for P3 uses the reconstructed frame resulting from the bitstream packing process performed for frame I0. This alternating sequence proceeds for the subsequent frames as shown. Note that each of the bitstream packing and mode decision modules may be idle in alternating time intervals.

Note also that in this figure and similar figures to follow, the numbered time intervals may not be equal in length, but may be as long as necessary to accommodate the indicated processing of a given frame.

Figure 3:
FIG. 3 is a diagram illustrating the processing of a frame sequence.

FIG. 3 shows an analogous processing sequence for a series of frames of the form IPPP . . . . Initially frame I0 (or an anchor frame P0) may be processed by the mode decision module. This frame may then be processed in the next time interval by the bitstream packing module, using the MVs and MB modes resulting from the mode decision process. After completion of the bitstream packing process for I0, the mode decision process may take place for the next frame. P1, in the next time interval. The mode decision process for P1 uses the reconstructed frame resulting from the bitstream packing process performed for frame I0. This alternating sequence proceeds for the subsequent frames as shown. Note that as before, each of the bitstream packing and mode decision modules may be idle in alternating time intervals.

In an embodiment, efficiency may be improved by allowing parallel operation of the mode decision and bitstream packing processes. An example is shown in FIG. 4, for the IBBPBBP . . . case. Here, mode decision processing for frame B2 does not have to wait for completion of bitstream packing of frame B1. Instead of using a reconstructed frame of B1, mode decision processing of B2 may use one or more reconstructed frames from previously processed I or P frames. In this instance, the reconstructed frames for I0 or P3 may be used. This allows the mode decision processing for B2 to take place concurrently with the bitstream packing processing for B1. This parallelism may continue as shown. Mode decision processing of P6 does not have to wait for completion of bitstream packing of B2; mode decision processing of P6 may use a reconstructed from a previous I or P frame, instead of waiting for the reconstructed frame of B2.

As a result, mode decision processing of P6 and bitstream packing of B2 may take place concurrently in the illustrated embodiment. This processing is based on the assumption that a B frame may not be used as the reference frame for the following frames. In at least one video coding standard, a B frame may also be allowed to serve as the motion estimation reference frame. If a B frame is set as the reference frame, it may be treated in the same way as a P frame.

Note that the frame sequence of FIG. 4 (i.e., IBBPBBP . . . ) features a repeated subsequence that includes two B frames before each P frame. In other sequences, there may be a subsequence that includes more than two B frames before each P frame.

Figure 5:
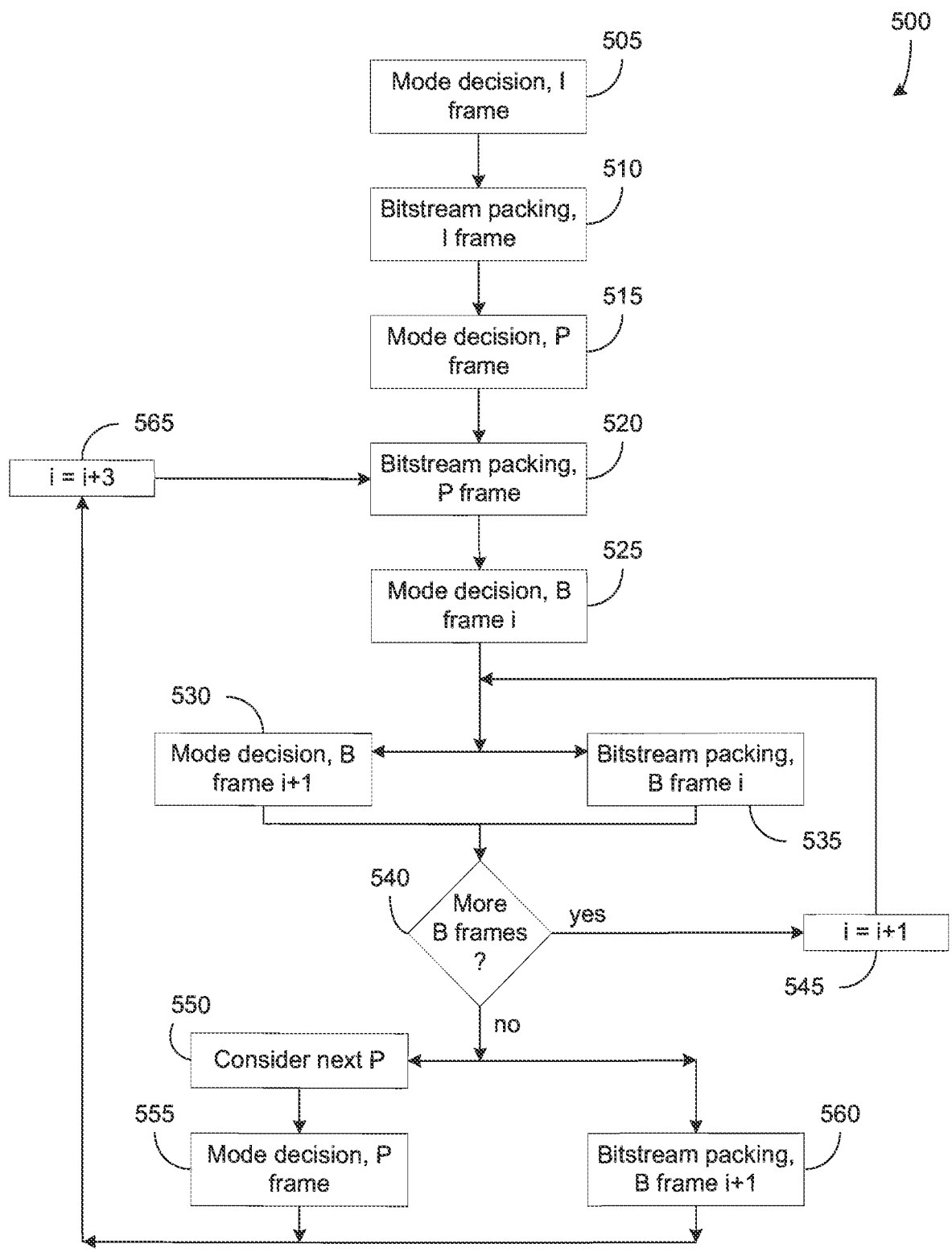
FIG. 5 is a flowchart illustrating exemplary processing of the embodiment of FIG. 4.

The processing of FIG. 4 is illustrated in FIG. 5, according to an embodiment. At 505, mode decision processing (including motion estimation) may be performed on the I frame. At 510, bitstream packing (including frame reconstruction) may be performed on this frame. At 515, mode decision processing may be performed on the first P frame (i.e., P3 in the example of FIG. 4). At 520, bitstream packing may be performed on this frame. At 525, mode decision processing may be performed on B frame i, where i=1 initially. This frame is shown as B1 in FIG. 4. At 530, mode decision processing may be performed on the next B frame, shown here as frame i+1. During this same time interval, bitstream packing may be performed on B frame i at 535.

At 540, a determination may be made as to whether there are additional B frames to be processed before the next P frame. If so, at 545, i may be incremented by 1, and processing may continue at 530 and 535, where the next B frames may be considered. If there are no more B frames to be processed before the next P frame, then processing may continue at 550, where the next P frame may be considered. At 555, mode decision processing may be performed on this next P frame. During this same time interval, bitstream packing may be performed on B frame i+1 at 560. Processing may then continue at 565, where i may be incremented by 3. Bitstream packing may then be performed on the P frame at 520.

In an alternative embodiment, mode decision processing of B1 may use an original frame as a reference instead of a reconstructed frame of P3. In this case, the mode decision processing of B1 may not have to wait for the completion of bitstream packing for P3. This allows mode decision processing of B1 to take place in parallel with bitstream packing for P3. This concept may be extended to every first B frame in each subsequence B . . . BP.

This is illustrated in FIG. 6. Here, mode decision processing of B1 may take place concurrently with bitstream packing for P3. As before, mode decision processing for frame B2 does not have to wait for completion of bitstream packing of frame B1. Instead of using a reconstructed frame of B1, mode decision processing of B2 may use one or more reconstructed frames from previously processed I or P frames. This allows the mode decision processing for B2 to take place concurrently with the bitstream packing processing for B1. This pattern may continue as shown.

Figure 7:
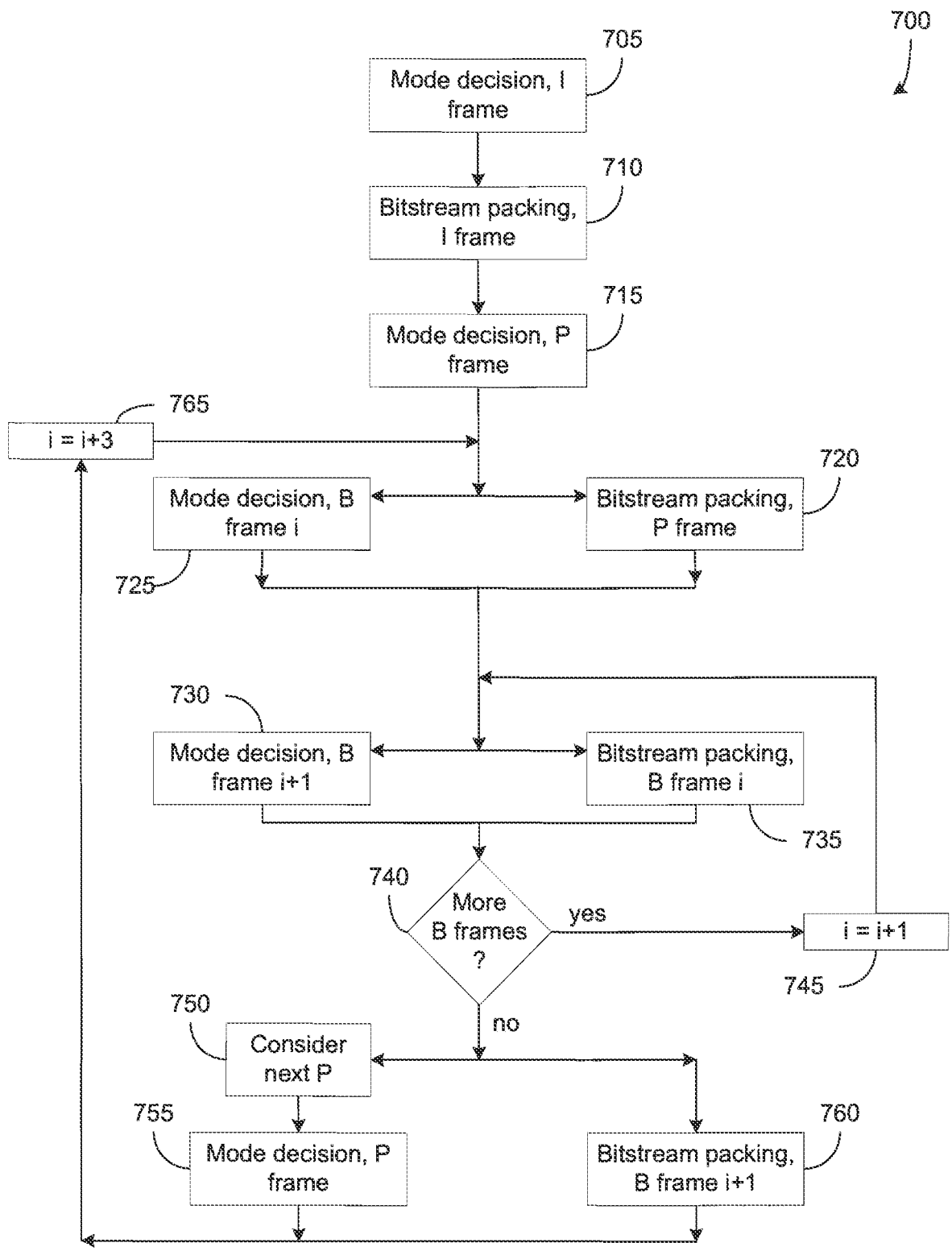
FIG. 7 is a flowchart illustrating exemplary processing of the embodiment of FIG. 6.

The processing of FIG. 6 is illustrated in FIG. 7, according to an embodiment. At 705, mode decision processing (including motion estimation) may be performed on the I frame. At 710, bitstream packing (including frame reconstruction) may be performed on this frame. At 715, mode decision processing may be performed on the first P frame (i.e., P3 in the example of FIG. 6). At 720, bitstream packing may be performed on this frame. Concurrently, at 725, mode decision processing may be performed on B frame i, where i=1 initially. This frame is shown as B1 in FIG. 6. At 730, mode decision processing may be performed on the next B frame, shown here as frame i+1. During this same time interval, bitstream packing may be performed on B frame i at 735.

At 740, a determination may be made as to whether there are additional B frames to be processed before the next P frame. If so, i may be incremented by 1 at 745, and processing may continue at 730 and 735, where the next B frames may be considered. If there are no more B frames to be processed before the next P frame, then processing may continue at 750, where the next P frame may be considered. At 755, mode decision processing may be performed on this next P frame. During this same time interval, bitstream packing may be performed on B frame i+1 at 760. Processing may then continue at 765, where i may be incremented by 3. Bitstream packing may then be performed on the P frame at 720 while mode decision processing may be performed on B frame i.

In an alternative embodiment, the first P frame may use the original frame of I0 for mode decision processing instead of the reconstructed frame that results from the bitstream packing of I0. This is illustrated in FIG. 8. Here, mode decision processing for P3 may take place concurrently with the bitstream packing of I0. The embodiment of FIG. 8 also takes advantage of the parallelism discussed above with respect to FIGS. 4 and 6. In particular, mode decision processing for frame B2 does not have to wait for completion of bitstream packing of frame B1. Instead of using a reconstructed frame of B1, mode decision processing of B2 may use one or more reconstructed frames from previously processed I or P frames. In this instance, the reconstructed frames for I0 or P3 may be used. This allows the mode decision processing for B2 to take place concurrently with the bitstream packing processing for B1. Also, mode decision processing of B1 may use an original frame as a reference instead of a reconstructed frame of P3. In this case, the mode decision processing of B may not have to wait for the completion of bitstream packing for P3. This allows mode decision processing of B1 to take place in parallel with bitstream packing for P3.

Figure 9:
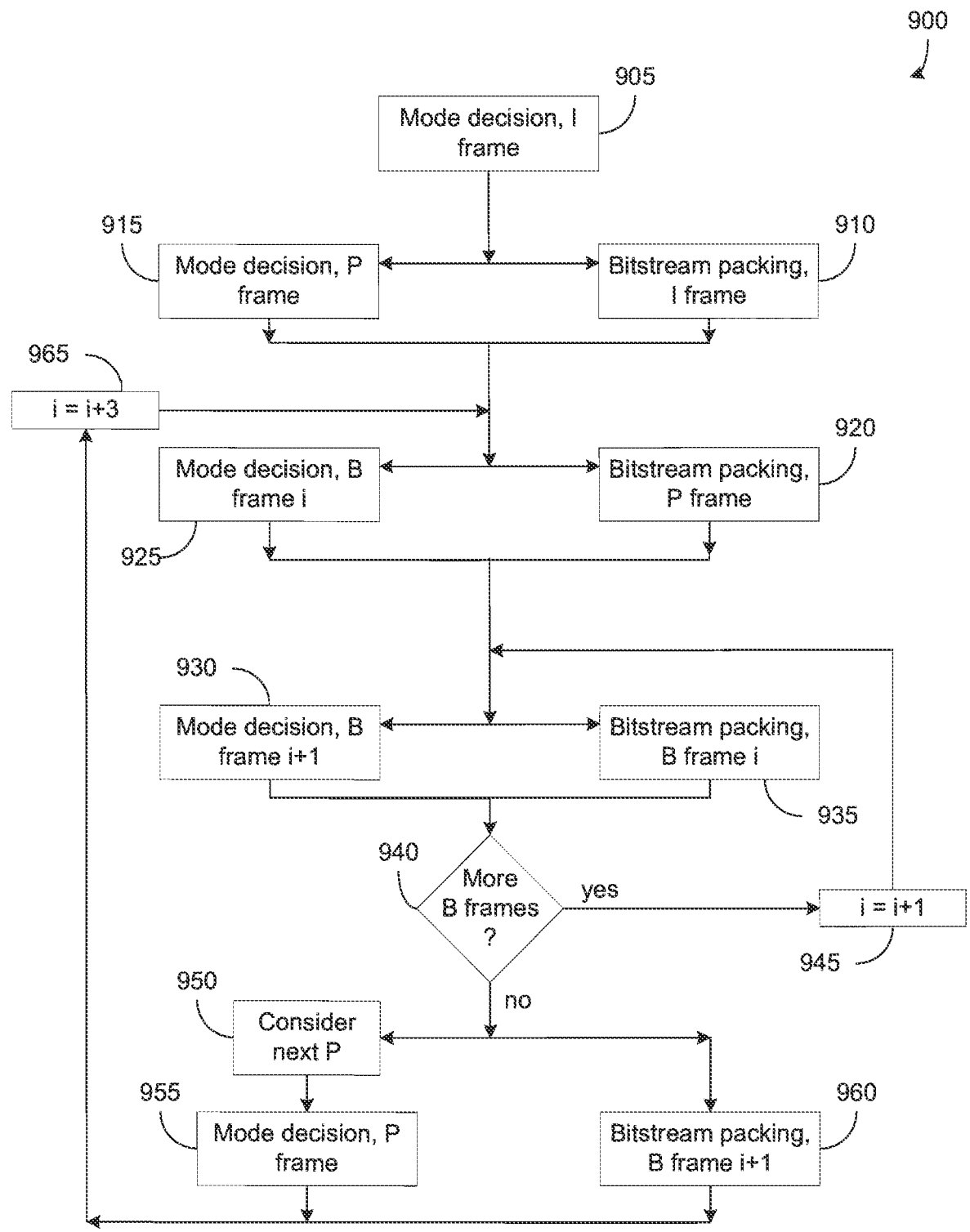
FIG. 9 is a flowchart illustrating exemplary processing of the embodiment of FIG. 8.

The processing of FIG. 8 is illustrated in FIG. 9, according to an embodiment. At 905, mode decision processing (including motion estimation) may be performed on the I frame. At 910, bitstream packing (including frame reconstruction) may be performed on this frame. Concurrently, at 915, mode decision processing may be performed on the first P frame (i.e. P3 in the example of FIG. 8). At 920, bitstream packing may be performed on this frame. Concurrently, at 925, mode decision processing may be performed on B frame i, where i=1 initially. This frame is shown as B1 in FIG. 8. At 930, mode decision processing may be performed on the next B frame, shown here as frame i+1. During this same time interval, bitstream packing may be performed on B frame i at 935.

At 940, a determination may be made as to whether there are additional B frames to be processed before the next P frame. If so, i may be incremented by 1 at 945, and processing may continue at 930 and 935, where the next B frames may be considered. If there are no more B frames to be processed before the next P frame, then processing may continue at 950, where the next P frame may be considered. At 955, mode decision processing may be performed on this next P frame. During this same time interval, bitstream packing may be performed on B frame i+1 at 960. Processing may then continue at 965, where i may be incremented by 3. Bitstream packing may then be performed on the current P frame at 920 while mode decision processing may be performed on B frame i at 925.

Figure 10:
FIG. 10 is a diagram illustrating the processing of a frame sequence, according to an alternative embodiment.

In another embodiment, original frames may be used as references for integer motion estimation, and reconstructed frames may be used as references for fractional motion estimation. This may allow the parallelization shown in FIG. 10. Here, integer motion estimation for the first P frame (i.e., P3_i) may use an original frame as a reference for motion estimation, instead of using a reconstructed frame that results from bitstream packing of I0. Motion estimation for P3_i may therefore be performed in parallel with bitstream packing of frame I0. Fractional motion estimation for the P frame (i.e., P3_f) may then be performed. For similar reasons, integer motion estimation for the first B frame (i.e., B1_i) may use an original frame as a reference for motion estimation, which may therefore be performed in parallel with bitstream packing of frame P3. Fractional motion estimation for the B1 frame (i.e., B1_f) may then be performed. As shown, the process may continue in this manner, wherein the initial B frame in each subsequence BB . . . BP undergoes separate integer and fractional motion estimation.

Figure 11:
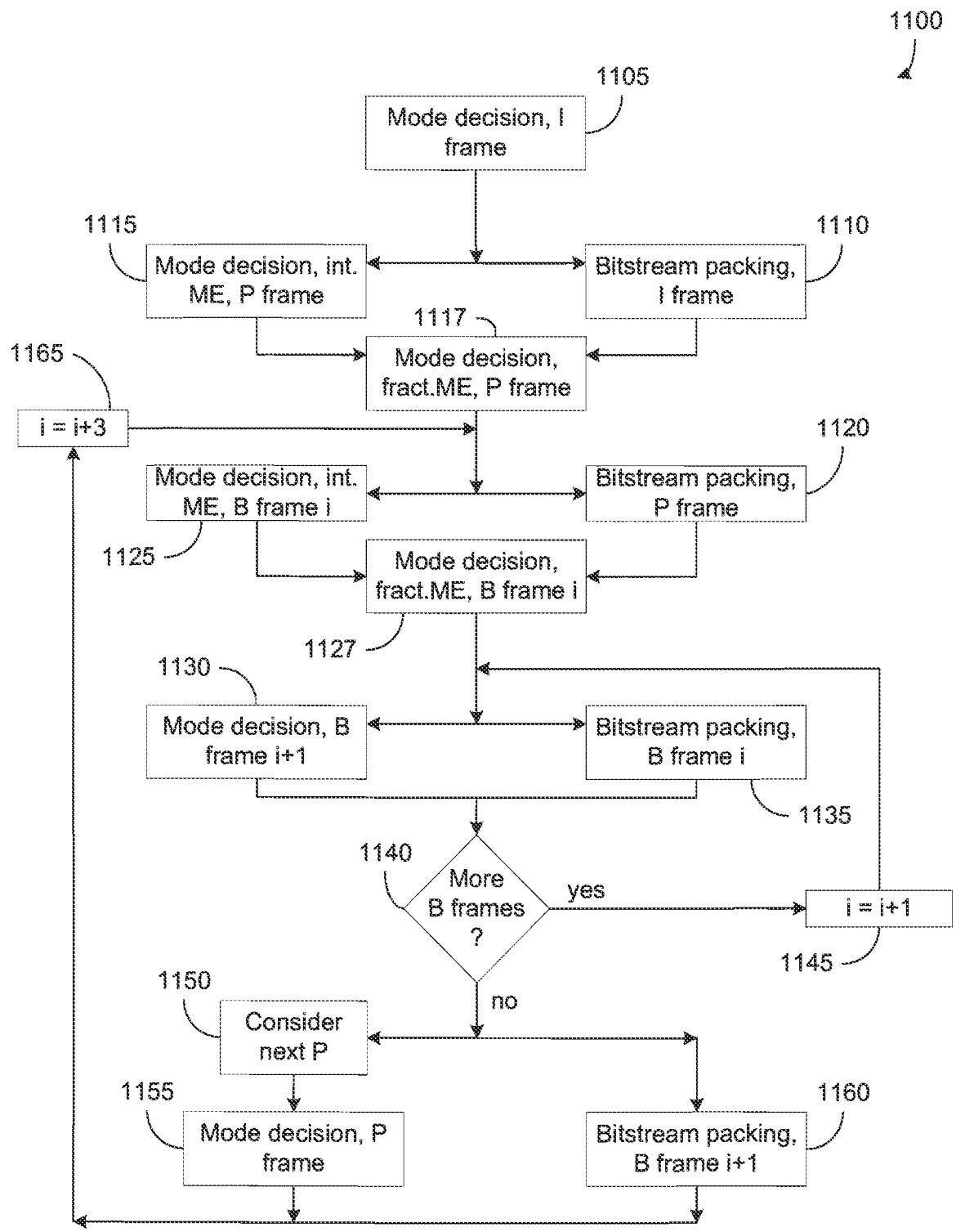
FIG. 11 is a flowchart illustrating exemplary processing of the embodiment of FIG. 10.

The processing for this embodiment is illustrated in FIG. 11. At 1105, mode decision processing (including motion estimation) may be performed on the I frame. At 1110, bitstream packing (including frame reconstruction) may be performed on this frame. Concurrently, at 1115, integer ME may be performed on the first P frame (i.e., P3 in the example of FIG. 10). At 1117, fractional ME may be performed on P3. At 1120, bitstream packing may be performed on this frame. Concurrently, at 1125 integer motion estimation may be performed on B frame i, where i=1 initially. This is shown as B1_i in FIG. 10. At 1127, fractional ME may be performed on B frame i. This is shown as B1_f in FIG. 10. At 1130, mode decision processing may be performed on the next B frame, shown here as B frame i+1. During this same time interval, bitstream packing may be performed on B frame i at 1135.

At 1140, a determination may be made as to whether there are additional B frames to be processed before the next P frame. If so, i may be incremented by 1 at 1145, and processing may continue at 1130 and 1135, where the next B frames may be considered. If there are no more B frames to be processed before the next P frame, then processing may continue at 1150, where the next P frame may be considered. At 1155, mode decision processing may be performed on this next P frame. During this same time interval, bitstream packing may be performed on B frame i+1 at 1160. Processing may then continue at 1165, where i may be incremented by 3. Bitstream packing may then be performed on the P frame at 1120, while mode decision processing, including integer ME, may be performed on B frame I at 1125.

A similar approach may be used to implement parallel processing given a series of frames of the form IPPP . . . . This is illustrated in FIG. 12. As discussed above, original frames may be used as references for integer motion estimation, and reconstructed frames may be used as references for fractional motion estimation. This may allow the parallelization shown in FIG. 12.

Here, integer motion estimation for the first P frame (i.e., P1_i) may use an original frame as a reference for motion estimation, instead of using a reconstructed frame that results from bitstream packing of I0. Motion estimation for P1_i may therefore be performed in parallel with bitstream packing of frame I0. Fractional motion estimation for the P frame (i.e. P1_f) may then be performed using the frame that was reconstructed in the bitstream packing of I0. Integer ME of the next P frame, shown as P2_i, may then be performed using an original frame instead of a reconstructed frame that would result from the bitstream packing of frame P1. Integer ME of P2 (i.e., P2_i) may therefore be performed in parallel with the bitstream packing of P1. Fractional ME of P2 (i.e., P2_f) may then be performed using the reconstructed frame resulting from the bitstream packing of P1. Processing may continue in this pattern as shown.

Figure 13:
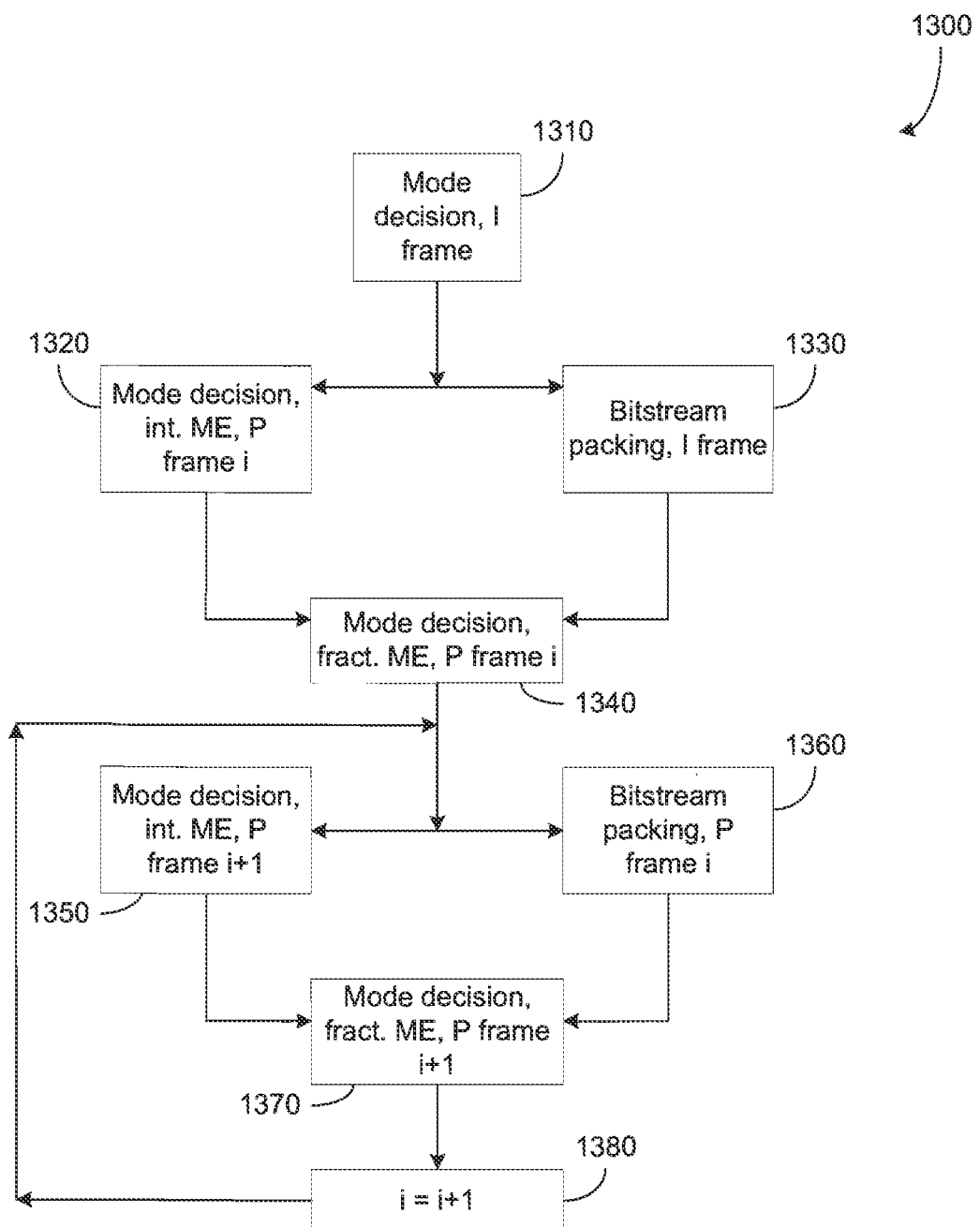
FIG. 13 is a flowchart illustrating exemplary processing of the embodiment of FIG. 12.

The processing for this embodiment is shown in FIG. 13. At 1310, mode decision processing may be performed for the I frame, I0. At 1320, integer ME may be performed on P frame i, where initially i=1. Concurrently, at 1330 bitstream packing may be performed on the I frame. At 1340, fractional ME may be performed on P frame i.

At 1350, integer ME may be performed on P frame i+1. Concurrently, at 1360 bitstream packing may be performed on P frame i. At 1370, fractional ME may be performed on P frame i+1. At 1380, i may be incremented by 1. Processing may then continue at 1350 and 1360, where the next P frames may be considered.

In another embodiment. N-layer hierarchical motion search may be used in motion estimation. In this case, original frames may be used for lower resolution motion estimation instead of the reconstructed frames that result from bitstream packing of a previous frame. The reconstructed frames may be used for higher resolution motion estimation, however. With respect to the low resolution motion estimation, coding efficiency may not be lost, because motion vectors from lower resolutions may be used only for search centers of higher resolution motion estimation and may be subsequently refined.

Because original frames may be used for lower resolution motion estimation instead of the reconstructed frames, parallelism may be implemented as shown in the embodiment of FIG. 14. Here, low resolution motion estimation for the first P frame (i.e., P3_L) may use an original frame as a reference for motion estimation, instead of using a reconstructed frame that results from bitstream packing of I0. Motion estimation for P3_L may therefore be performed in parallel with bitstream packing of frame I0. High resolution motion estimation for the P frame (i.e., P3_H) may then be performed. Similarly, low resolution motion estimation for the first B frame (i.e., B1_i) may use an original frame as a reference for motion estimation, which may therefore be performed in parallel with bitstream packing of frame P3. High resolution motion estimation for the B1 frame (i.e., B1_H) may then be performed. As shown, the process may continue in this manner, wherein the initial B frame in each subsequence BB . . . BP undergoes separate low resolution and high resolution motion estimation.

Figure 15:
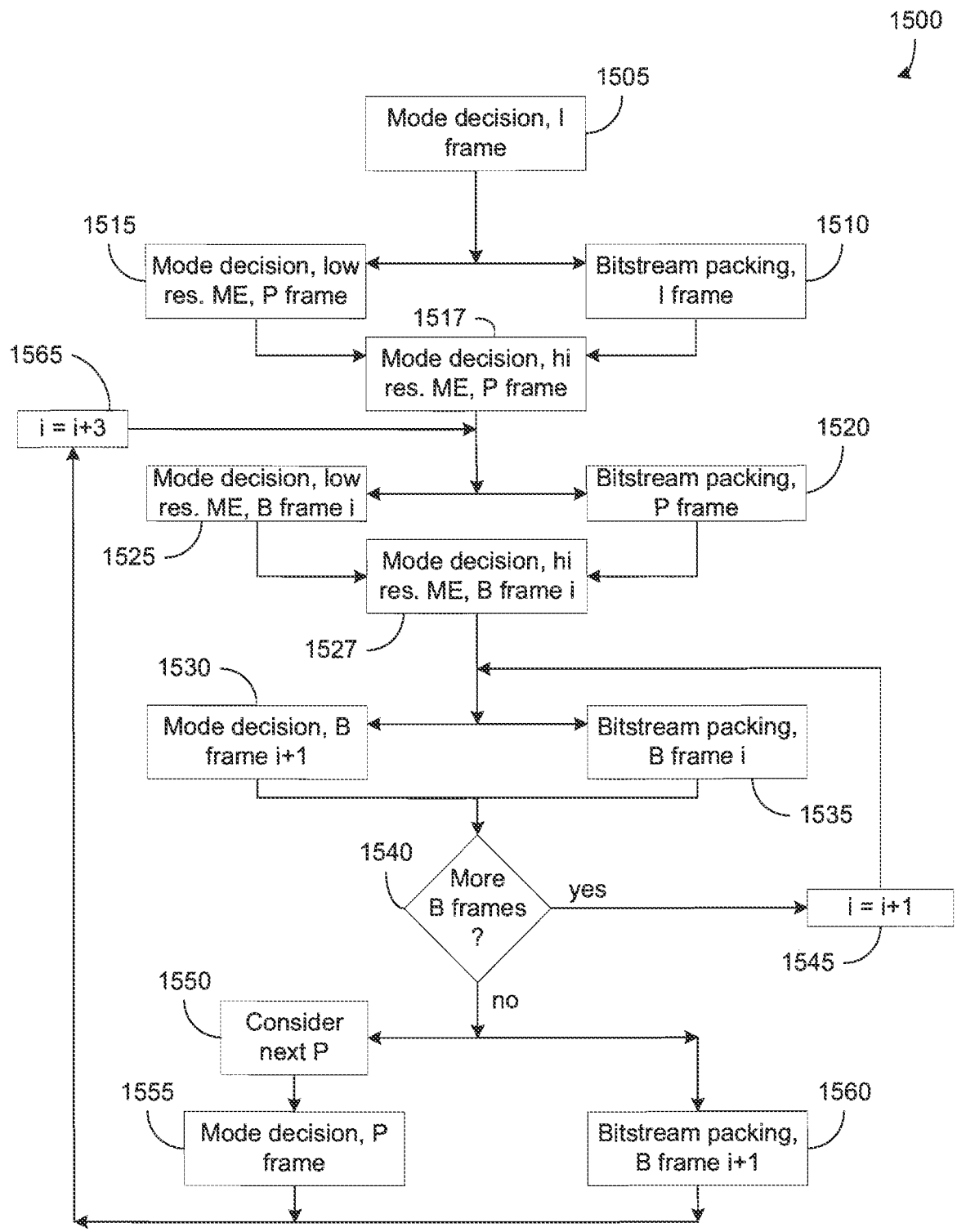
FIG. 15 is a flowchart illustrating exemplary processing of the embodiment of FIG. 14.

The processing for this embodiment is illustrated in FIG. 15. At 1505, mode decision processing (including motion estimation) may be performed on the I frame. At 1510, bitstream packing (including frame reconstruction) may be performed on this frame. Concurrently at 1515, low resolution ME may be performed on the first P frame (i.e., P3_L in the example of FIG. 14).

At 1517, high resolution ME may be performed on P3, i.e., P3_H in FIG. 14. At 1520, bitstream packing may be performed on P3. Concurrently, at 1525, low resolution motion estimation may be performed on B frame i, where i=1 initially. This is shown as B1_L in FIG. 14. At 1527, high resolution ME may be performed on B frame i. This is shown as B1_H in FIG. 14. At 1530, mode decision processing may be performed on the next B frame, shown here as B frame i+1. During this same time interval, bitstream packing may be performed on B frame i at 1535.

At 1540, a determination may be made as to whether there are additional B frames to be processed before the next P frame. If so, i may be incremented by 1 at 1545, and processing may continue at 1530 and 1535, where the next B frames may be considered. If there are no more B frames to be processed before the next P frame, then processing may continue at 1550, where the next P frame may be considered. At 1555, mode decision processing may be performed on this next P frame. During this same time interval, bitstream packing may be performed on B frame i+1 at 1560. Processing may then continue at 1565, where i may be incremented by 3. Bitstream packing may then be performed on the current P frame at 1520, while mode decision processing, including low resolution ME, may be performed on B frame i.

Figure 16:
FIG. 16 is a diagram illustrating the processing of a frame sequence, according to an alternative embodiment.

This concept may also be extended to frame sequences of the form IPP . . . P. This is illustrated in the embodiment of FIG. 16. Here, low resolution motion estimation for the first P frame (i.e., P1_L) may use an original frame as a reference for motion estimation, instead of using a reconstructed frame that results from bitstream packing of I0. Motion estimation for P1_L may therefore be performed in parallel with bitstream packing of frame I0. High resolution motion estimation for the P frame (i.e., P1_H) may then be performed using the frame that was reconstructed in the bitstream packing of I0. Low resolution ME of the next P frame, shown as P2_L, may then be performed using an original frame instead of a reconstructed frame that would result from the bitstream packing of frame P1. Low resolution ME of P2 (i.e., P2_L) may therefore be performed in parallel with the bitstream packing of P1. High resolution ME of P2 (i.e., P2_H) may then be performed using the reconstructed frame resulting from the bitstream packing of P1. Processing may then continue in this manner, as shown.

Figure 17:
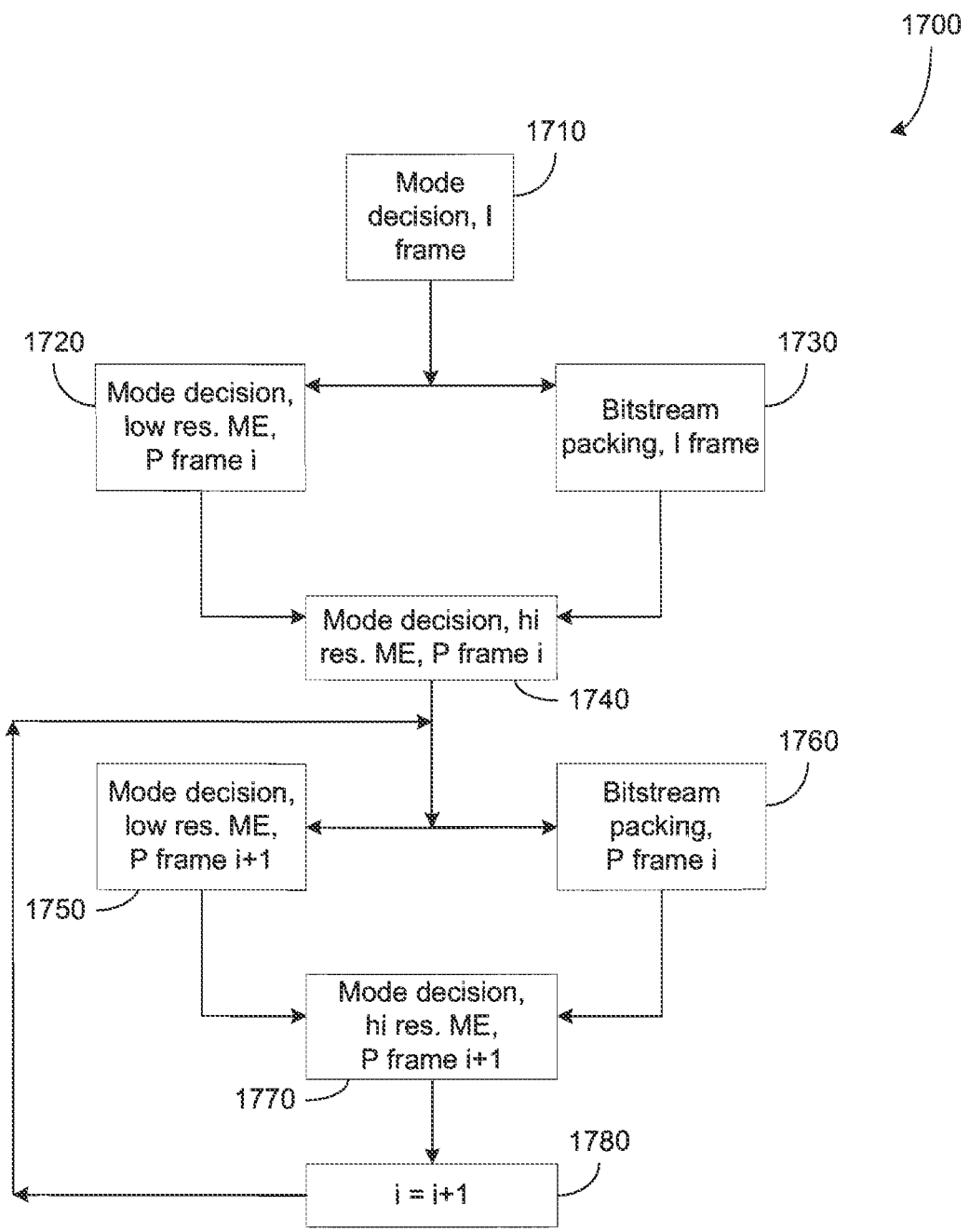
FIG. 17 is a flowchart illustrating exemplary processing of the embodiment of FIG. 16.

The processing for this embodiment is shown in FIG. 17. At 1710, mode decision processing may be performed for the I frame, I0. At 1720, low resolution ME may be performed on P frame i, where initially i=1. Concurrently, at 1730 bitstream packing may be performed on the I frame. At 1740, high resolution ME may be performed on P frame i.

At 1750, low resolution ME may be performed on P frame i+1. Concurrently, at 1760 bitstream packing may be performed on P frame i. At 1770, high resolution ME may be performed on P frame i+1. At 1780, i may be incremented by 1. Processing may then continue at 1750 and 1760, where the next P frames may be considered.

The systems, methods and computer program products described herein may be implemented in a video encoder or other component that includes similar functionality. Moreover, the systems, methods and computer program products described herein may also be implemented in the context of a personal computer (PC), laptop computer, ultra-laptop or netbook computer, tablet, touch pad, portable computer, handheld computer, palmtop computer, personal digital assistant (PDA), cellular telephone, combination cellular telephone/PDA, smart device (e.g., smart phone, smart tablet or smart television), mobile internet device (MID), messaging device, data communication device, and so forth.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device.

Figure 18:
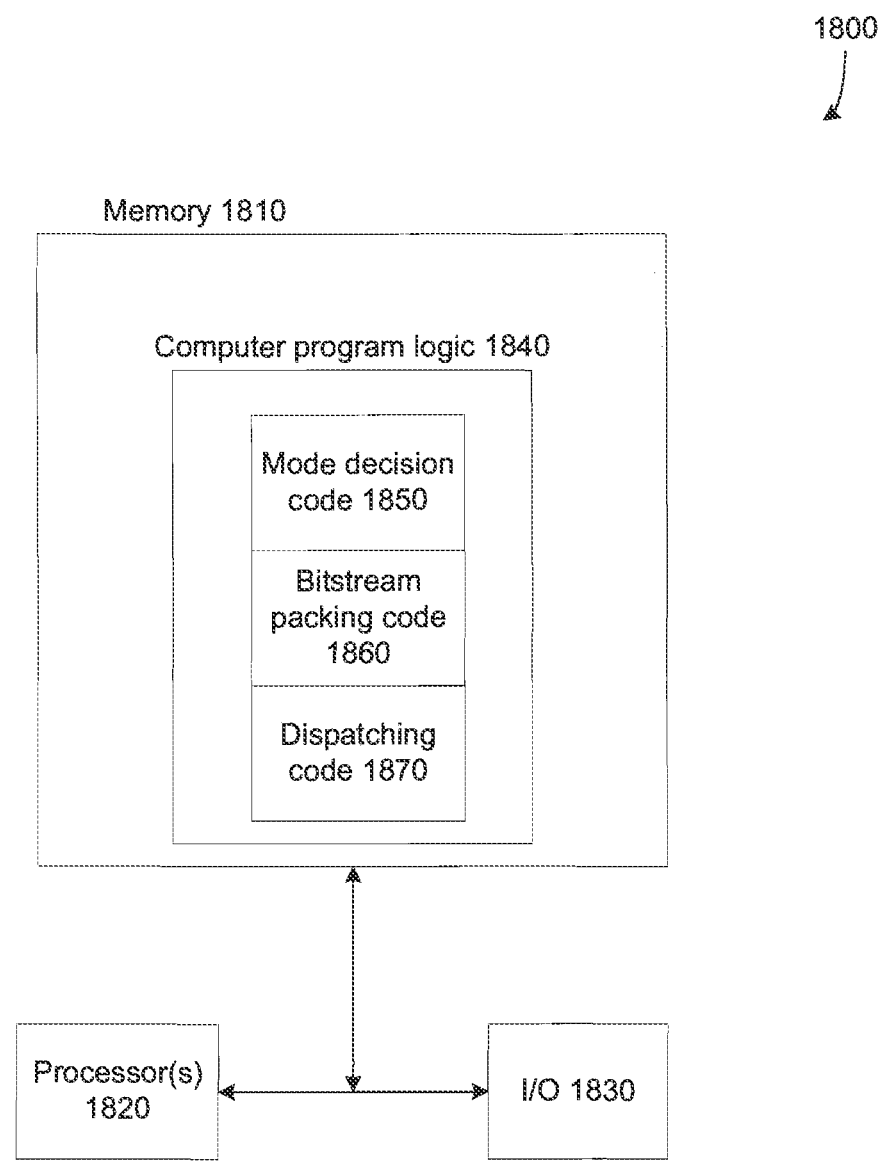
FIG. 18 is a block diagram illustrating the computing context of a software or firmware embodiment.

A software embodiment of the comparison and normalization functionality is illustrated in FIG. 18. The illustrated system 1800 may include one or more processor(s) 1820 and may further include a body of memory 1810. Processor(s)

1820 may include a central processing unit (CPU) and/or a graphics processing unit (GPU). Memory 1810 may include one or more computer readable media that may store computer program logic 1840. Memory 1810 may be implemented as a hard disk and drive, a removable media such as a compact disk, a read-only memory (ROM) or random access memory (RAM) device, for example, or some combination thereof. Processor(s) 1820 and memory 1810 may be in communication using any of several technologies known to one of ordinary skill in the art, such as a bus. Computer program logic 1840 contained in memory 1810 may be read and executed by processor(s) 1820. One or more I/O ports and/or I/O devices, shown collectively as I/O 1830, may also be connected to processor(s) 1820 and memory 1810.

Computer program logic 1840 may include mode decision code 1850. This module may be responsible for the mode decision processing described above, including motion estimation. As described above, in some embodiments motion estimation may be performed using original frames instead of reconstructed frames. In such a case, mode decision code 1850 may be appropriately configured to perform motion estimation using original frames.

Computer program logic 1840 may include bitstream packing code 1860. This module may be responsible for the bitstream packing processing described above, including frame reconstruction.

Computer program logic 1840 may include dispatching code 1850. This module may be responsible for the dispatching of a given frame for mode decision processing and/or bitstream packing processing, where these processes sometimes take place in parallel as described above.

This parallelism may be achieved in part by executing the different processes in different components. In an embodiment (not shown), mode decision processing may be implemented in software or firmware, while bitstream packing may be implemented in hardware. In an alternative embodiment, bitstream packing may be implemented in software or hardware, while mode decision processing may be implemented in hardware. Alternatively, bitstream packing and mode decision processing may both be implemented in software/firmware, where each may be executed on different processors. For example, bitstream packing may be implemented in software or firmware executed on a CPU, while mode decision processing may be implemented in software or firmware executed on a GPU.

Note that the above description relates to frame coding. The concepts described above, however, may be applied more broadly to other forms of coding. For example, as would be understood by a person of ordinary skill in the art, the concepts above may also be applied to field coding, where a given frame may be separated into top and bottom fields. Here an encoder may process a frame by separately processing the top and bottom fields, treating them as separate frames.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A video encoding method for a sequence of frames composed of an intra frame (I frame) followed by a set of subsequences, where each subsequence is composed of, in coding order, a predictive frame (P frame) followed by first and second bi-predictive frames (B frames), the method comprising:
performing mode decision on the I frame;
performing reconstruction on the I frame;
performing mode decision on the P frame while performing the reconstruction on the I frame during a first time interval, wherein integer motion estimation of the P frame is performed during reconstruction of the I frame and by using an original version of the I frame rather than a reconstructed I frame as a reference frame so that the integer motion estimation of the P frame can be performed without waiting for the I frame to be reconstructed, after which fractional motion estimation of the P frame is performed non-parallel to the I frame reconstruction and by using the reconstructed I frame as the reference frame;
performing reconstruction on the P frame;
performing mode decision on the first B frame, wherein integer motion estimation of the first B frame is performed during reconstruction of the P frame using an original version of the P frame rather than a reconstructed P frame as a reference frame so that the integer motion estimation of the P frame can be performed without waiting for the P frame to be reconstructed, after which fractional motion estimation of the first B frame is performed in non-parallel to the P frame reconstruction and by using the reconstructed P frame as the reference frame; and
during a second time interval, subsequent to the first time interval, performing reconstruction on the first B frame while performing mode decision on the second B frame, wherein the mode decision uses one or more of a frame reconstructed from the I frame and a frame reconstructed from the P frame.

2. The method of claim 1, wherein:
motion estimation of the P frame further comprises a hierarchical motion search, in which a first motion estimation of the P frame at a first resolution is performed during reconstruction of the I frame, after which a second motion estimation of the P frame at a resolution higher than the first resolution of the P frame, is performed based on motion vectors determined from the first motion estimation; and
motion estimation of the first B frame further comprises a hierarchical motion search, in which a first motion estimation of the first B frame at a first resolution is performed during reconstruction of the P frame, after which a second motion estimation of the first B frame at a higher resolution than the first resolution of the first B frame is performed based on motion vectors determined from the first B frame motion estimation.

3. The method of claim 2, wherein the motion estimation of the P frame and the first B frame at the first resolutions are performed using original frames; and
the motion estimation of the P frame and the first B frame at the higher resolutions are performed using reconstructed frames.

4. A system, comprising:

a central processor;

a graphics processor; and one or more memory devices in communication with said processors, wherein said memory device stores a plurality of processing instructions configured to encode a video including a sequence of frames composed of an intra frame (I frame) followed by a set of subsequences, where each subsequence is composed of, in coding order, a predictive frame (P frame) followed by first and second bi-predictive frames (B frames) wherein:

the graphics processor is to perform mode decision on the I frame;

the central processor is to perform reconstruction on the I frame;

the graphics processor is to perform mode decision on the P frame while the central processor perform the reconstruction on the I frame during a first time interval, wherein integer motion estimation of the P frame is performed during reconstruction of the I frame and by using an original version of the I frame rather than a reconstructed I frame as a reference frame so that the integer motion estimation of the P frame can be performed without waiting for the I frame to be reconstructed, after which fractional motion estimation of the P frame is performed non-parallel to the I frame reconstruction and by using the reconstructed I frame as the reference frame;

the central processor is to perform reconstruction on the P frame;

the graphics processor is to perform mode decision on the first B frame, wherein integer motion estimation of the first B frame is performed during reconstruction of the P frame using an original version of the P frame rather than a reconstructed P frame as a reference frame so that the integer motion estimation of the first B frame can be performed without waiting for the P frame to be reconstructed, after which fractional motion estimation of the first B frame is performed in non-parallel to the P frame reconstruction and by using the reconstructed P frame as the reference frame; and during a second time interval, subsequent to the first time interval, the central processor is to perform reconstruction on the first B frame while the graphics processor performs mode decision on a second B frame using one or more of a frame reconstructed from the I frame and a frame reconstructed from the P frame.

5. The system of claim 4, wherein the motion estimation of the P frame further comprises a hierarchical motion search, in which a first motion estimation of the P frame at a first resolution is performed during reconstruction of the I frame, after which a second motion estimation of the P frame at a resolution higher than the first resolution of the P frame, is performed based on motion vectors determined from the first motion estimation; and the motion estimation of the first B frame further comprises a hierarchical motion search, in which a first motion estimation of the first B frame at a first resolution is performed during reconstruction of the P frame, after which a second motion estimation of the first B frame at a higher resolution than the first resolution of the first B frame is performed based on motion vectors determined from the first B frame motion estimation.

6. The system of claim 5, wherein the motion estimation of the P frame and the first B frame at the first resolutions are performed using original frames; and the motion estimation of the P frame and the first B frame at the higher resolutions are performed using reconstructed frames.

7. A computer program product including non-transitory computer readable media having computer program logic stored therein for encoding a video including a sequence of frames composed of an intra frame (I frame) followed by a set of subsequences, where each subsequence is composed of, in coding order, a predictive frame (P frame) followed by first and second bi-predictive frames (B frames), wherein the logic further comprises:

logic to cause a first processor to perform mode decision on the I frame;

logic to cause a second processor to perform reconstruction on the I frame;

logic to cause the first processor to perform mode decision on the P frame while the second processor performs the reconstruction on the I frame during a first time interval, wherein integer motion estimation of the P frame is performed during reconstruction of the I frame and by using an original version of the I frame rather than a reconstructed I frame as a reference frame so that the integer motion estimation of the P frame can be performed without waiting for the I frame to be reconstructed, after which fractional motion estimation of the P frame is performed non-parallel to the I frame reconstruction and by using the reconstructed I frame as the reference frame;

logic to cause the second processor to perform reconstruction on the P frame;

logic to cause the first processor to perform mode decision on the first B frame, wherein integer motion estimation of the first B frame is performed during reconstruction of the P frame using an original version of the P frame rather than a reconstructed P frame as a reference frame so that the integer motion estimation of the P frame can be performed without waiting for the P frame to be reconstructed, after which fractional motion estimation of the first B frame is performed in non-parallel to the P frame reconstruction and by using the reconstructed P frame as the reference frame; and logic to cause the second processor to perform reconstruction on the first B frame while the first processor performs the mode decision on the second B frame, during a second time interval, subsequent to the first time interval.

8. The computer program product of claim 7, wherein the motion estimation on the P frame further comprises a hierarchical motion search, in which a first motion estimation of the P frame at a first resolution is performed during reconstruction of the I frame, after which a second motion estimation of the P frame at a resolution higher than the first resolution of the P frame, is performed based on motion vectors determined from the first motion estimation; and the motion estimation on the first B frame further comprises a hierarchical motion search, in which a first motion estimation of the first B frame at a first resolution is performed during reconstruction of the P frame, after which a second motion estimation of the first B frame at a higher resolution than the first resolution of the first B frame is performed based on motion vectors determined from the first B frame motion estimation.

* * * * *